United States Patent
Wang

(10) Patent No.: US 7,565,237 B2
(45) Date of Patent: Jul. 21, 2009

(54) CONTROL OF IN-CYLINDER CONDITIONS OF AN INTERNAL COMBUSTION ENGINE OPERATING WITH MULTIPLE COMBUSTION MODES

(75) Inventor: Junmin Wang, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 12/061,711

(22) Filed: Apr. 3, 2008

(65) Prior Publication Data

US 2008/0243361 A1    Oct. 2, 2008

Related U.S. Application Data

(63) Continuation of application No. 11/691,720, filed on Mar. 27, 2007, now Pat. No. 7,389,173.

(51) Int. Cl.
*F02D 41/14* (2006.01)
*F02M 25/07* (2006.01)
*G06F 19/00* (2006.01)

(52) U.S. Cl. .......................... 701/103; 60/602

(58) Field of Classification Search .......... 701/103, 701/102, 29, 35; 60/601–603; 123/435
See application file for complete search history.

(56) References Cited

U.S. PATENT DOCUMENTS

| | | | |
|---|---|---|---|
| 4,671,068 A | 6/1987 | Moody et al. | 60/602 |
| 6,390,055 B1 | 5/2002 | Sivashankar et al. | 123/295 |
| 6,561,157 B2 | 5/2003 | zur Loye et al. | 123/295 |
| 6,684,849 B2 | 2/2004 | zur Loye et al. | 123/295 |
| 6,880,518 B2 | 4/2005 | Shiraishi et al. | 123/295 |
| 6,907,870 B2 | 6/2005 | zur Loye et al. | 123/594 R |
| 7,010,409 B2 | 3/2006 | Lu et al. | 701/70 |
| 7,206,688 B2 | 4/2007 | Wang et al. | 701/103 |
| 7,367,310 B2 * | 5/2008 | Kakuya et al. | 123/295 |
| 7,389,173 B1 * | 6/2008 | Wang | 701/103 |
| 2008/0040085 A1 * | 2/2008 | Wang | 703/7 |

FOREIGN PATENT DOCUMENTS

| | | | |
|---|---|---|---|
| JP | 2002188522 | | 7/2002 |
| JP | 2008128141 A | * | 6/2008 |
| WO | 0186128 | | 11/2001 |
| WO | 2006050383 | | 5/2006 |

* cited by examiner

*Primary Examiner*—Hieu T Vo
(74) *Attorney, Agent, or Firm*—Baker Botts L.L.P.

(57) ABSTRACT

A method of controlling a diesel engine that is capable of multiple combustion modes and equipped with a turbocharger and EGR loop. The control method avoids a singularity condition inherent in turbocharged diesel engine having multiple combustion modes. For different combustion modes, different system states, control variables, and actuators are carefully chosen for different controllers based on the characteristics of the corresponding combustion mode as well as sensor and measurement limitations.

27 Claims, 4 Drawing Sheets

CONTROL OF IN-CYLINDER CONDITIONS OF AN INTERNAL COMBUSTION ENGINE OPERATING WITH MULTIPLE COMBUSTION MODES

RELATED APPLICATION

This application is a continuation of U.S. patent application Ser. No. 11/691,720 filed Mar. 27, 2007, now U.S. Pat. No. 7,389,173 the contents of which is hereby incorporated in its entirety by reference.

TECHNICAL FIELD OF THE INVENTION

This invention relates to control systems for internal combustion engines, and more particularly to a control system for an internal combustion engine having multiple combustion modes.

BACKGROUND OF THE INVENTION

In recent years, it has become apparent that conventional diesel combustion cannot alone meet emission levels mandated for the future. Hence, diesel engine manufacturers have been considering multiple combustion modes as a means to reduce emissions. Alternate combustion modes such as homogeneous charge compression ignition (HCCI), low temperature combustion (LTC), and premixed charge compression ignition (PCCI) are being developed and implemented on diesel engines, together with conventional diesel combustion.

At steady-state, alternate combustion modes offer great potential to reduce engine emission levels. However, because the applicable speed-load regions of different combustion modes are different from each other, the engine must seamlessly switch among these modes.

The different combustion modes are achieved by different fueling and in-cylinder conditions. Some modes are close to the edge of unstable combustion, and are very sensitive to engine conditions.

For diesel engines, fueling control can be exercised precisely on a cycle-by-cycle basis. However, in-cylinder conditions change at a much slower rate (over several combustion cycles). Poor control over in-cylinder conditions not only diminishes the merits of alternate combustion modes but also worsens drivability and emissions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Dynamic Engine Model as Basis for Control System

One approach to designing control systems for engine in-cylinder conditions is to first develop a dynamic model of the engine. The model can be implemented in a graphical simulation environment, using real or simulated engine conditions as inputs. Appropriate software is used to build the model and to manage data.

Once the model is developed, additional software can be used to develop an engine controller that can accept various engine conditions and achieve desired performance. After developing and tuning the control system through simulations, control system programming is easily generated for production-level controller hardware. In sum, good engine models are indispensable for a transition from a rapid prototyping controller to a production-level controller.

For purposes of this invention, the modeling is of the intake and exhaust of an engine operating with multiple combustion modes. The dynamics of various intake and exhaust passage sections and components of the engine are modeled, based on physical laws with intentional simplifications and reductions. The resulting dynamic model is used as the basis for design of an in-cylinder engine condition control system.

A feature of the model is that it models only those engine characteristics necessary for multiple mode engine control. That is, it does not attempt to comprehensively model the entire engine. Various simplifications are made, such as modeling the turbocharger dynamics as a first order system. The model thereby simplifies the process of designing a control system suitable for controlling multiple engine mode transitions.

Dynamic Engine Modeling System

Figure 1:
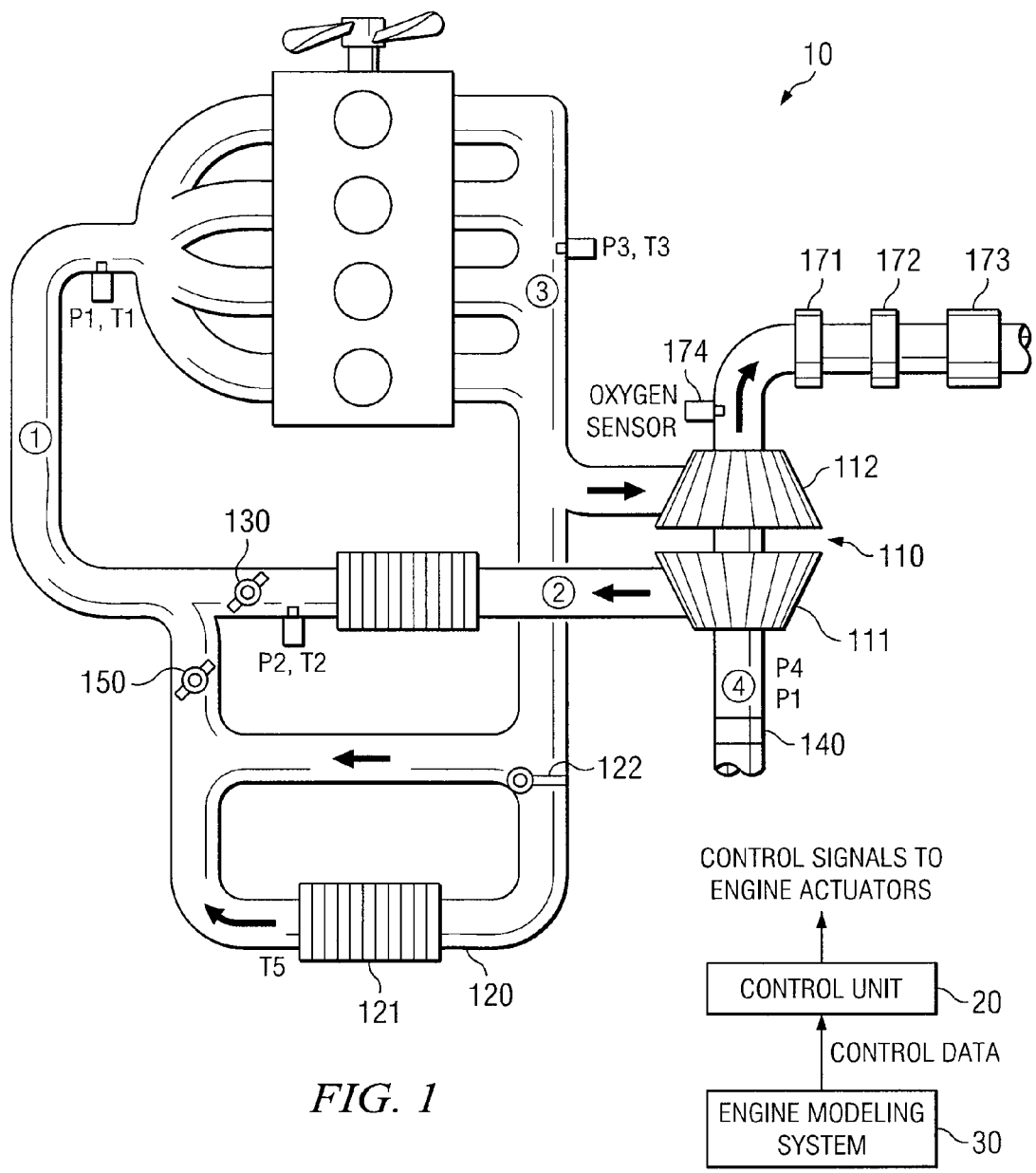
FIG. 1 illustrates a diesel engine suitable for multiple combustion modes, modeled in accordance with the invention.

FIG. 1 illustrates an engine 100, capable of operating with multiple combustion modes. An example of such an engine 100 is a light duty 4-cylinder common rail diesel engine. The engine is equipped with a turbocharger 110, and a high pressure EGR loop 120 with two paths (cooled and uncooled). The tailpipe has various exhaust treatment devices, such as a diesel oxidation catalyst 171, diesel particulate filter 172, and lean NOx trap 173.

Modeling system 30 models engine 10 for purposes of designing a control system 20 for operation of, and transitioning between, multiple engine modes. As explained below, modeling system 30 is used to determine how various actuators can be controlled to provide desired pressure and air fraction conditions of engine 10. Modeling system 30 can be implemented with computer equipment programmed to store and execute the equations and data described herein. As explained above, control system 20 is designed using modeling system 30, and for production engines is implemented with appropriate engine control system hardware and software.

A more complete description of modeling system 30 is set out in U.S. Patent Application Ser. No. 60/836,818, entitled "Dynamic Modeling of an Internal Combustion Engine Operating with Multiple Combustion Modes", incorporated by reference herein.

Various sections associated with the air intake and exhaust of engine 100 are each represented in the model. These include:

| Section 1 | intake manifold (between the high-pressure throttle and high-pressure EGR valve and engine intake valves) |
|---|---|
| Section 2 | intake passage between compressor and high pressure throttle |
| Section 3 | exhaust manifold |
| Section 4 | intake to turbocharger |

As compared to a model for an engine having only conventional combustion, a model of engine 100 requires more variables and system states. In general, evolution of in-cylinder conditions can be viewed as a multi-variable nonlinear system.

The model described herein may be generally described as an "engine intake and exhaust system dynamic model". The actuators of interest for the model are the turbocharger 110 (its output flow), the intake manifold throttle 130, and EGR throttle 150. The model is especially directed to the dynamics of the fresh air fraction in the intake manifold, that is, the ratio of fresh air from the compressor to the amount of recirculated exhaust gas, and the various pressures.

The actuators are used to control the fresh air fraction and pressure so that these parameters are appropriate for a given combustion mode. If a desired pressure or fresh air fraction is known, model system 30 can be used to determine how to actuate throttles 130 and 150 and the output of turbocharger 110.

Turbocharger 110 has a compressor 111 and turbine 112, and is assumed to be a variable output turbocharger. An example of a suitable turbocharger is a variable geometry turbocharger (VGT). As explained below, the compressor power is modeled as a differential equation.

As stated above, engine 100 also has an EGR (exhaust gas recirculation loop), which is a high pressure loop. EGR cooler 121 cools the exhaust before it is mixed with fresh air from the compressor 111.

Temperatures at various intake and exhaust points of engine 100 are also represented in the model. FIG. 1 illustrates the location of various temperature and pressure measurement sensors, for sensing T1, T2, and T3 (temperatures) and P1, P2, and P3 (pressures). Some temperature and pressure values can be inferred or assumed. For example, P4 is assumed to be the atmospheric pressure. T5 can be inferred from T2 and the intercooler efficiency. An O2 sensor 174 is installed to measure the O2 in the exhaust from the exhaust manifold.

Engine 100 has several intake or exhaust sections, which are labeled 1-4 in FIG. 1. The intake and exhaust modeling is based on principles of mass and energy conservation as well as the ideal gas law.

Pressures in the various sections can be expressed as:

$$\dot{p}_1 = -\frac{\gamma \eta_v N_e V_d}{120 V_1} p_1 + \frac{R\gamma T_{HT}}{V_1} W_{HT} + \frac{R\gamma T_{EGR}}{V_1} W_{EGR} \quad (1)$$

$$\dot{p}_2 = \frac{R\gamma T_c \eta_c P_c}{V_2 C_p T_4 \left[\left(\frac{p_2}{p_4}\right)^{\frac{\gamma-1}{\gamma}} - 1\right]} - \frac{R\gamma T_{HT}}{V_2} W_{HT}$$

$$\dot{p}_3 = \frac{R\gamma}{V_3} \left[\frac{T_{eo} \eta_v N_e V_d}{120 R T_1} p_1 + T_{eo} W_f - T_3 W_{EGR} - T_3 W_t\right]$$

-continued $$\dot{P}_c = -\frac{P_c}{\tau_{tc}} + \frac{C_p T_3 \eta_t}{\tau_{tc}}\left[1 - \left(\frac{p_t}{p_3}\right)^{\frac{\gamma-1}{\gamma}}\right] W_t$$

For a diesel engine, combustion is usually lean, which means that the air in the cylinder mixture exceeds the stoichiometric amount. As a result, the exhaust gas contains unburned air and can be re-circulated back into the intake manifold through EGR valve 150. The fraction of air (or EGR gas) in-cylinder is important for combustion and emissions performance, especially for alternate combustion modes, which can be close to unstable.

The dynamics of the fresh air conditions can be described as:

$$\dot{F}_1 = \frac{RT_1}{p_1 V_1}[(1 - F_1)W_{HT} + (F_3 - F_1)W_{EGR}] \quad (2a)$$

$$\dot{F}_3 = \frac{RT_3}{p_3 V_3} W_{eo}(F_{eo} - F_3) \quad (2b)$$

$$F_{eo} = \frac{W_e F_1 - W_f \lambda_s}{W_e + W_f} = \frac{W_f(\lambda_m - \lambda_s)}{W_e + W_f} \quad (2c)$$

$$F_1 = \frac{W_f \lambda_m}{W_e} \quad (2d)$$

In the above equations, $\lambda_s$ is the stoichiometric air to fuel ratio, $\lambda_m$ is the measured air to fuel ratio by a UEGO (universal exhaust gas oxygen) sensor installed on the exhaust manifold. The value $F_3$ can be estimated from Equation (2b) as:

$$F_3 = \frac{\frac{RT_3}{p_3 V_3} W_{eo}}{s + \frac{RT_3}{p_3 V_3} W_{eo}} F_{eo} \quad (3)$$

If the pressure-drop of the inlet air filter is ignored, then the condition in Section 4 of the engine is same as atmosphere, $p_4 = p_a$, $T_4 = T_a$. The value $p_a$ is atmosphere pressure, which is assumed known and can be measured by standard sensors. The value $T_a$ is the inlet air temperature, which is available from mass airflow (MAF) sensor 140.

For modeling system 30, the system states are $x_1 = p_1$, $x_2 = p_2$, $x_3 = p_3$, $x_4 = P_c$, and $x_5 = F_1$, or $x = [p_1\ p_2\ p_3\ P_c\ F_1]^T$. The values $p_1$, $p_2$ and $p_3$ can be measured by sensors as shown in FIG. 1. The values $P_c$ and $F_1$ can be calculated or estimated based on other measurements such as MAF, AFR, and temperatures.

The system inputs are $u_1 = W_{HT}$, $u_2 = W_{EGR}$, and $u_3 = W_t$, or $u = [W_{HT}\ W_{EGR}\ W_t]^T$, corresponding to gas flow rates through the high-pressure throttle, EGR valve, and turbine, respectively. These flow rates can be converted into angles of the high pressure throttle valve 130, the EGR valve 150, and the nozzle position of the variable geometry turbocharger (VGT) 110, through inverse orifice equations or mappings.

The fueling rate $W_f$ is determined by engine maps and treated as an external signal. The value $p_t$ is the turbine pressure, which can be calculated based on the signal of the exhaust section delta pressure sensor as $p_t = p_a + \Delta p_{ex}$.

For notation simplicity, let $$k_1 = \frac{\gamma \eta_v N_e V_d}{120 V_1}, k_2 = \frac{R\gamma T_c \eta_c p_a^{(\gamma-1)/\gamma}}{V_2 C_p T_a}, k_{ht1} = \frac{R\gamma T_{HT}}{V_1},$$

$$k_{r1} = \frac{R\gamma T_{EGR}}{V_1}, k_{ht2} = \frac{R\gamma T_{HT}}{V_2}, k_3 = \frac{\gamma T_{eo} \eta_v N_e V_d}{120 V_3 T_1},$$

$$k_{r3} = k_{t3} = \frac{R\gamma T_3}{V_3}, k_f = \frac{R\gamma T_{eo}}{V_3}, k_{t1} = \frac{C_p T_3 \eta_t}{\tau_{tc}},$$

$$k_{t2} = \frac{C_p T_3 \eta_t (p_a + \Delta p_{ex})^{(\gamma-1)/\gamma}}{\tau_{tc}}, k_4 = \frac{RT_1}{p_1 V_1}, \text{ and}$$

$$\kappa = \frac{\gamma-1}{\gamma}.$$

Thus, the engine model used by modeling system 30 can be rewritten as:

$$\dot{x}_1 = -k_1 x_1 + k_{ht1} u_1 + k_{r1} u_2 \quad (4)$$

$$\dot{x}_2 = k_2 \left( \frac{x_4}{x_2^\kappa - p_a^\kappa} \right) - k_{ht2} u_1$$

$$\dot{x}_3 = k_3 x_1 - k_{r3} u_2 - k_{t3} u_3 + k_f W_f$$

$$\dot{x}_4 = -\frac{1}{\tau_{tc}} x_4 + k_{t1} u_3 - \frac{k_{t2} u_3}{x_3^\kappa}$$

$$\dot{x}_5 = k_4(1 - x_5) u_1 + k_4 (F_3 - x_5) u_2$$

In the above equations, values are obtained for pressure at three sections of the engine as well as for the compressor power and a fresh air value. These values are used to model the behavior of engine 100. Using the model, control unit 20 can be programmed to control in-cylinder conditions for optimum engine control, including determining when to switch modes and conditions that will achieve optimum mode transitions.

More specifically, for a given combustion mode, certain parameters such as pressure and fresh air ratio are desired. The model can be used to determine which engine inputs will result in desired outputs. The inputs include the positions of the HP throttle 130 and EGR throttle 150 and the flow through turbine 112.

The above-described modeling approach (modeling the dynamics of each section in the intake and exhaust passages with necessary measurement and estimations) can be easily expanded for engines with different intake and exhaust system configurations, such as dual-loop EGR systems.

Singularity Issues

The above-described model can be expressed in a general state space form, which is:

$$\begin{pmatrix} \dot{x}_1 \\ \dot{x}_2 \\ \dot{x}_3 \\ \dot{x}_4 \\ \dot{x}_5 \end{pmatrix}_x = \underbrace{\begin{pmatrix} -k_1 x_1 \\ \frac{k_2 x_4}{x_2^\kappa - p_a^\kappa} \\ k_3 x_1 + k_f W_f \\ -\frac{x_4}{\tau_{tc}} \\ 0 \end{pmatrix}}_{f(x)} + \underbrace{\begin{pmatrix} k_{ht1} & k_{r1} & 0 \\ -k_{ht2} & 0 & 0 \\ 0 & -k_{r3} & -k_{t3} \\ 0 & 0 & k_{t1} - \frac{k_{t2}}{x_3^\kappa} \\ k_4(1-x_5) & k_4(F_3-x_5) & 0 \end{pmatrix}}_{g(x)} \begin{pmatrix} u_1 \\ u_2 \\ u_3 \end{pmatrix}_u$$

$$\dot{x} = f(x) + g(x) u$$

The engine, as modeled above, has a singularity at $x_2 = p_2 = p_a$ which means compressor flow becomes infinite. For conventional control systems, it is claimed that $p_2$ will be above atmosphere pressure all the time. However, for a turbocharged diesel engine running alternate combustion modes, such as LTC, the intake manifold pressure could vary from much lower than atmosphere pressure to much higher than atmosphere pressure. Therefore, this singularity problem needs to be addressed.

In addition, several parameters in the model are uncertain and there are also some un-modeled dynamics in the actual system. Therefore, the control system has to be sufficiently robust to handle the parameter uncertainties and un-modeled dynamics.

Control System

As stated above, different combustion modes have different characteristics and operating ranges. System outputs for control system 20 to track the desired values are selected for different combustion modes. In this example of this description, two combustion modes, low temperature combustion (LTC) and conventional diesel combustion, are considered. In the following equations, to distinguish the different controllers and variables, the subscripts "a" and "c" are used for the alternate (LTC) and conventional combustion modes respectively.

Control for LTC Combustion Mode

Combustion features of the LTC mode are: low fresh airflow rate, high EGR rate, low AFR (about 17~21), low intake manifold pressure (about 70~98 kPa), and low torque range (about 0~60 Nm).

To perform good closed-loop control, measurements or estimations of certain system signals need to be reliable and accurate. In particular, intake fresh air, EGR amounts, and pressure measurements or estimations are important.

However, in the LTC mode, the noise-to-signal ratio of the MAF sensor signal is high, and measurement accuracy can be poor due to low fresh airflow rate. The MAF measurement may not be reliable enough for closed-loop control purposes. On the other hand, because the exhaust AFR is low (close to stoichiometric), the measured AFR ratio signal from a typical UEGO sensor is accurate and reliable. Thus, the estimated intake manifold fresh air fraction, $F_1$, calculated from Equation (2d) using measured AFR is reliable.

Therefore, $y_a = [p_1 \ F_1]^T$ is the system output vector that controller 20 will use to manipulate actuators to track the desired values $y_{ad} = [p_{1d} \ F_{1d}]^T$.

Because the intake manifold pressure is lower than atmosphere pressure for LTC, the turbocharger is not used in this mode. The actuators are then the high-pressure throttle valve 130 and EGR valve 150. The system state-space equations are:

$$\dot{y}_a = \begin{pmatrix} -k_1 x_1 \\ 0 \end{pmatrix} + \begin{pmatrix} k_{ht1} & k_{r1} \\ k_4(1-x_5) & k_4(F_3-x_5) \end{pmatrix} \begin{pmatrix} u_1 \\ u_2 \end{pmatrix} \quad (7)$$

$$u_a = f_a(y_a, y_{ad}, x, k_a)$$

By tracking the desired $[p_{1d} \ F_{1d}]^T$, the fresh air amount in-cylinder will be close to the desired value. Several advanced control system design methods such as sliding mode control, feedback linearization, and Lyapunov-based control design can be used for the tracking control design. For experimental test results, a multi-input-multi-output sliding mode control was designed for this system. It could be shown that the zero dynamics involved for the rest of the system state is stable.

Control for Conventional Diesel Combustion Mode

Some of the combustion features of the conventional combustion mode are: higher fresh airflow rate, relatively lower EGR rate, higher AFR (about 21~28), higher intake manifold pressure (above atmosphere pressure), and higher torque range (60 Nm up to peak torque).

To control combustion at conventional diesel combustion mode, intake manifold pressure, fresh air charge/EGR rate are important variables. Control system 20 needs to track the desired values.

In the conventional combustion mode, the exhaust AFR is higher than in LTC mode, and the signal from a typical UEGO sensor may not be accurate. On the other hand, since the fresh air mass flow rate is higher than in LTC mode, a typical production MAF sensor should provide a sufficiently accurate measurement.

Based on these considerations, the system output vector is $y_c=[p_1 \, W_c \, p_3]^T$. The value $W_c$ is the fresh air flow rate through the compressor. If the control system 20 can track these three variables, the engine intake gas charge amount and EGR rate can be controlled as desired. The actuators (the available control inputs) are the high-pressure throttle, EGR valve, and VGT.

$$W_C = \frac{P_c \eta_c}{C_p T_4 \left[\left(\frac{p_2}{p_4}\right)^{\frac{\gamma-1}{\gamma}} - 1\right]} = \frac{P_c \eta_c}{C_p T_a \left[\left(\frac{p_2}{p_a}\right)^\kappa - 1\right]} \quad (8)$$

$$\dot{W}_C = \frac{\eta_c \dot{P}_c}{C_p T_a \left[\left(\frac{p_2}{p_a}\right)^\kappa - 1\right]} + \frac{-P_c \eta_c \left(\kappa \frac{p_2^{\kappa-1}}{p_a^\kappa}\right) \dot{p}_2}{C_p T_a \left[\left(\frac{p_2}{p_a}\right)^\kappa - 1\right]^2} \quad (9)$$

$$= -\frac{W_c}{\tau_{tc}} + c(x)u_3 - d(x)k_{2c}W_c^2 + d(x)W_c k_{ht2}u_1$$

Where $c(x) = \dfrac{\eta_c T_3 \eta_t \left[1 - \left(\frac{p_t}{x_3}\right)^\kappa\right]}{\tau_{tc} T_a \left[\left(\frac{x_2}{p_a}\right)^\kappa - 1\right]}$, $d(x) = \dfrac{\kappa p_2^{\kappa-1}}{p_2^\kappa - p_a^\kappa}$, and $k_{2c} = \dfrac{R\gamma T_c}{V_2}$ $$\dot{y}_c = \underbrace{\begin{pmatrix} -k_1 x_1 \\ -\frac{W_c}{\tau_{tc}} - d(x)k_{2c}W_c^2 \\ k_3 x_1 + k_f W_f \end{pmatrix}}_{a(x)} + \underbrace{\begin{pmatrix} k_{ht1} & k_{r1} & 0 \\ d(x)W_c k_{ht2} & 0 & c(x) \\ 0 & -k_{r3} & -k_{t3} \end{pmatrix}}_{b(x)} \underbrace{\begin{pmatrix} u_1 \\ u_2 \\ u_3 \end{pmatrix}}_{u_c} \quad (10)$$

$u_c = f_c(y_c, y_{cd}, x, k_c)$

By tracking the desired $y_{cd}=[p_{1d} \, W_{cd} \, p_{3d}]^T$, combustion is well controlled under transient conditions.

Several advanced control system design methods such as sliding mode control, feedback linearization, and Lyapunov-based control design can be used for the tracking control design. For experimental test results, a multi-input-multi-output sliding mode control system was designed for this system. It is also easy to show that the zero dynamics involving the rest system states is stable.

Supervisory Controller

As explained below in connection with FIG. 4, control system has a supervisory controller whose task is to switch among different controllers based on driver demand and engine operating conditions. For a turbocharged diesel engine, another purpose of the supervisory controller is to avoid the above-described singularity condition.

The singularity occurs when $p_2$ is close to $p_a$ and turbocharger 110 is used, and must be avoided to prevent undesired behaviors of control system 20. In LTC mode, the intake manifold pressure is below $p_a$ and turbocharger 110 is not used. However, when the intake manifold pressure approaches $p_a$, the system is close to the switching surface from LTC to conventional diesel combustion.

To prevent the singularity condition happening at conventional diesel combustion, the VGT is intentionally offset to increase $p_2$ above $p_a$. Thus, $p_2$ is above $p_a$ from the beginning of the conventional diesel combustion mode. When LTC engine operation conditions are close to the switching surface, the intake manifold pressure is close to $p_a$ and the exhaust gas has sufficient energy to push the turbine to increase $p_2$ by the compressor. As $p_2$ is increased at the high end of LTC combustion, the high-pressure throttle is automatically adjusted to control $p_1$ as desired.

Figure 2:
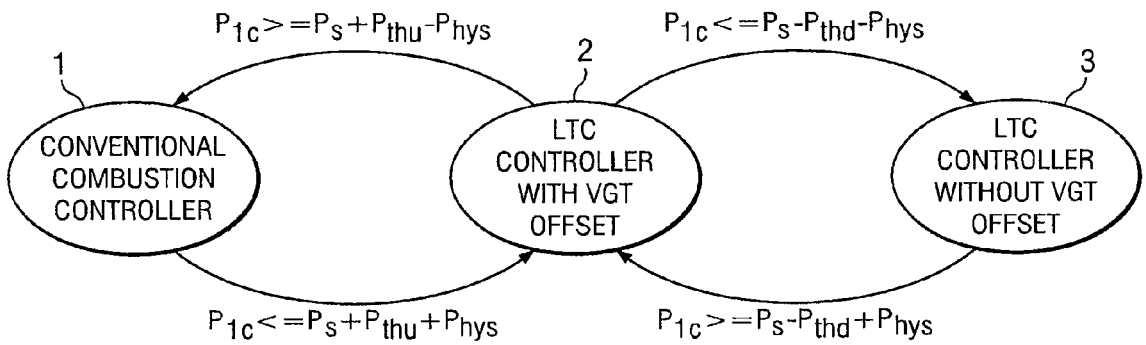
FIG. 2 illustrates a finite state machine representing mode switching between a conventional combustion mode and a low temperature combustion mode.

FIG. 2 illustrates a finite state machine (FSM) for conducting the mode switching task. As illustrated, the FSM has three states:
1. Conventional Combustion Controller
2. LTC controller with VGT offset
3. LTC controller without VGT offset.

Figure 3:
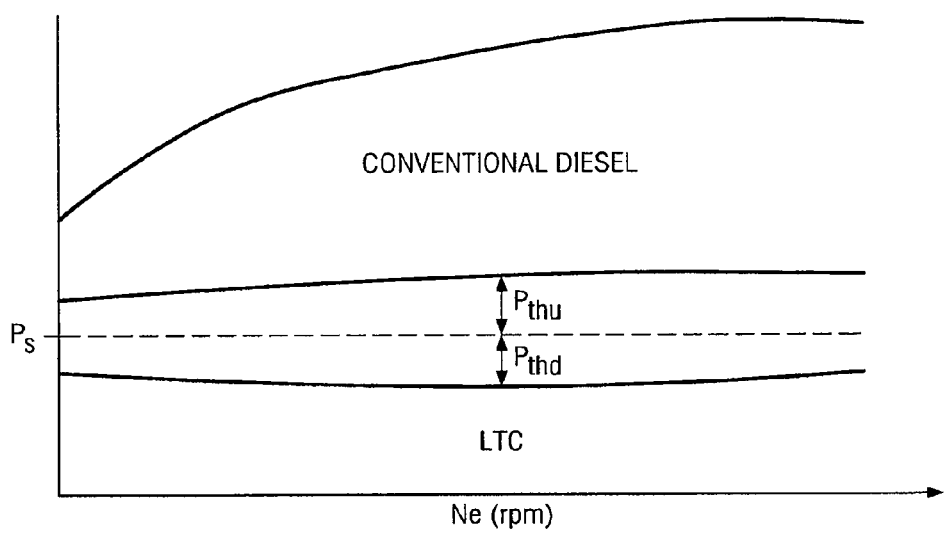
FIG. 3 illustrates the switching surface between the conventional combustion mode and the low temperature combustion mode.

FIG. 3 illustrates the switching surface for LTC and conventional diesel combustion modes. The value $p_{thd}$ is the thickness of the switching surface from below, and $p_{thu}$ is the thickness of the switching surface from above. These values are each a function of engine operating conditions, such as engine speed.

The value $p_{1c}$ is defined as a function of the desired intake manifold pressure, $p_{1d}$, and the actual intake manifold pressure, $p_1$, such that:

$$p_{1c}=f(p_{1d},p_1) \quad (11)$$

Coming from the LTC area (Mode 3 in FIG. 2) where turbocharger is not used, if $p_{1c} \geq p_s - p_{thd} + p_{hys}$, the system is switched to Mode 2 where VGT is offset to increase $p_2$ above $p_a$ to prepare switching up to conventional diesel combustion. The value $p_s$ is the switching pressure, which is approximately equal to atmosphere pressure, and $p_{hys}$ is a hysteresis gap to avoid frequent mode switching. At Mode 3, the LTC controller described above is used.

At Mode 2, if $p_{1c} \leq p_s - p_{thd} - p_{hys}$, it is switched back to Mode 3 and VGT goes back to rest position. If $p_{1c} \geq p_s + p_{thu} + p_{hys}$, it is switched to Mode 1 for conventional diesel combustion. At Mode 2, the LTC controller described above is used.

At Mode 1, if $p_{1c} \leq p_s + p_{thu} - p_{hys}$, it is switched back to Mode 2 for LTC with VGT offset. At Mode 1, the conventional diesel combustion controller described above is used.

Overall System Control

Figure 4:
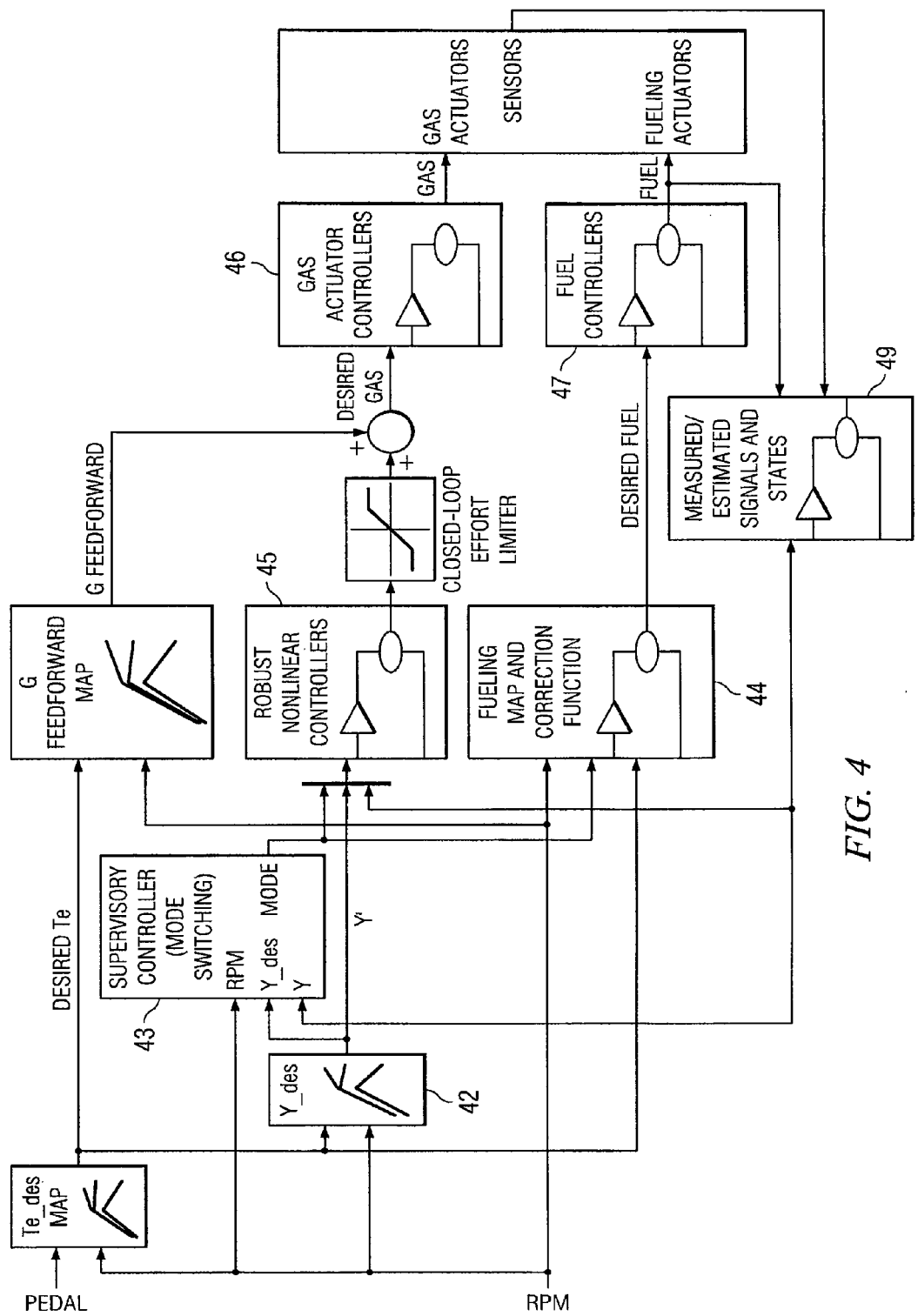
FIG. 4 is a block diagram of a control system for a diesel engine having multiple combustion modes.

FIG. 4 is a block diagram of the overall control system 20. Three vectors of variables in FIG. 4 are: Y, a vector of the system state, Y=[P1, F1, Wc, . . . ]; G, a vector of gas (i.e., air and EGR) actuators, G=[Throttle, EGR, VGT, SCV, VVA, . . . ]; and F, a vector of fueling parameters, F=[injection timing, injection quantity, injection pressure, . . . ]. As explained above, the variables used for these vectors depend on the combustion mode.

Processing unit 41 receives values for engine speed and the driver's pedal position input, and calculates a desired engine torque.

Processing unit 42 receives engine speed and desired torque, and determines a desired engine operation state vector, $Y^*$. This vector consists of variables such as intake manifold pressure, fresh air fraction, fresh airflow rate, etc.

The desired state vector, $Y^*$, the measured state vector, $Y$, and engine speed are fed to the supervisory controller 43, which determines which mode and corresponding mode controller should be active.

Processing unit 44 receives the decided mode, engine speed and desired torque, and determines engine fueling parameters such as injection pattern, injection quantities, injection timings and injection pressure, etc.

The desired state vector and measured/estimated state vector are fed into selected nonlinear robust controller 45. The output of the controller 45 together with a feed-forward control, which is a function of engine speed and desired torque, are combined and delivered to actuator controller 46, which controls various actuators such as throttle, EGR valve, VGT, etc., to make the actual states track the desired states.

Processing unit 49 receives signals measured from sensors equipped on the engine and fueling input, and determines the actual engine state. This state data is delivered to processing unit 43 and 45 as described above.

Illustrative Engine Test Results

To illustrate the benefits of the control approach described herein, experimental results from a modern light-duty diesel engine were obtained. Two measures of good engine performance are engine torque response (for driveability) and exhaust gas AFR (for emission amounts).

Figure 5A:
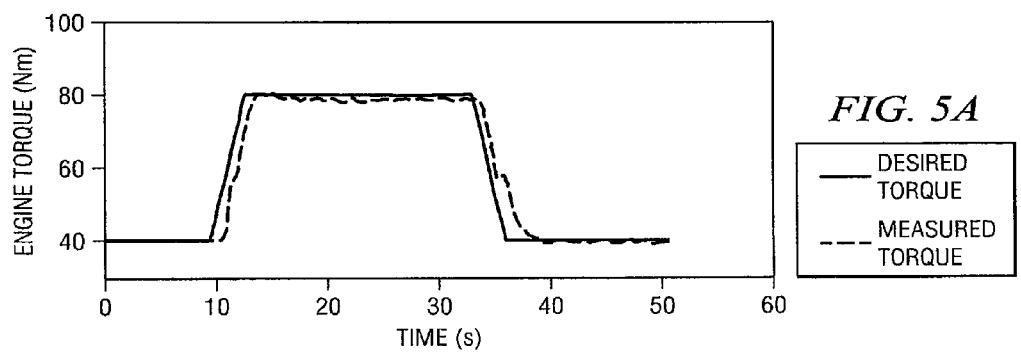
FIGS. 5A and 5B illustrate transient torque responses and exhaust AFR for transitioning from low temperature combustion to conventional combustion in accordance with a conventional control method.
Figure 5B:
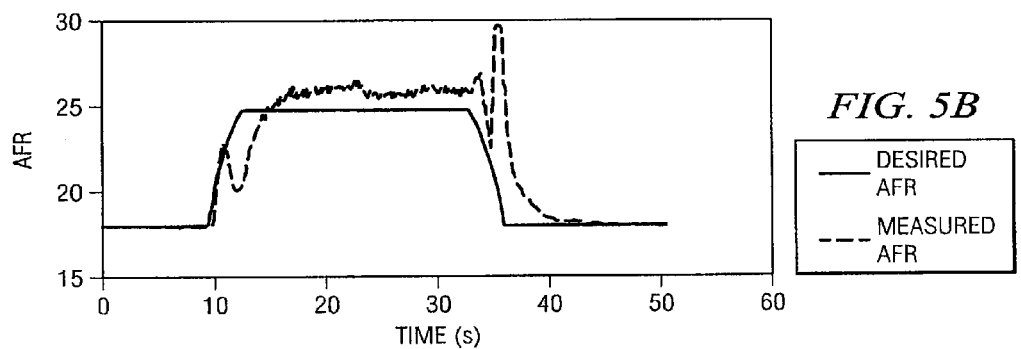

FIGS. 5A and 5B illustrate transient torque responses and measured exhaust AFR, using conventional calibration/mapping based control, for the transition from a light load LTC mode to a conventional combustion mode. During the combustion mode transition, some torque fluctuations are exhibited. The AFR significantly deviates from a desired value especially at combustion mode transitions, which will cause high engine-out emissions. The main reason for these undesired behaviors is that the actuators' tables and maps are calibrated at steady-state and cannot account for system dynamics during transient conditions. Un-coordinated movements of actuators cause undesired engine in-cylinder conditions, and cause undesired combustions and emissions.

Figure 6A:
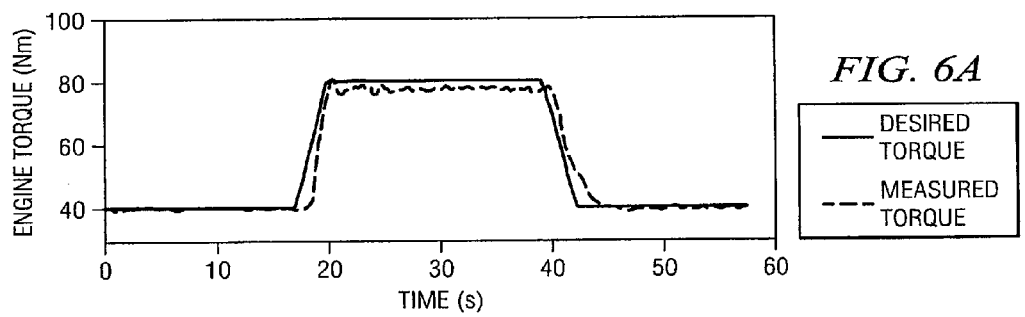
FIGS. 6A and 6B illustrate transient torque responses and exhaust AFR for transitioning from low temperature combustion to conventional combustion in accordance with the invention.
Figure 6B:
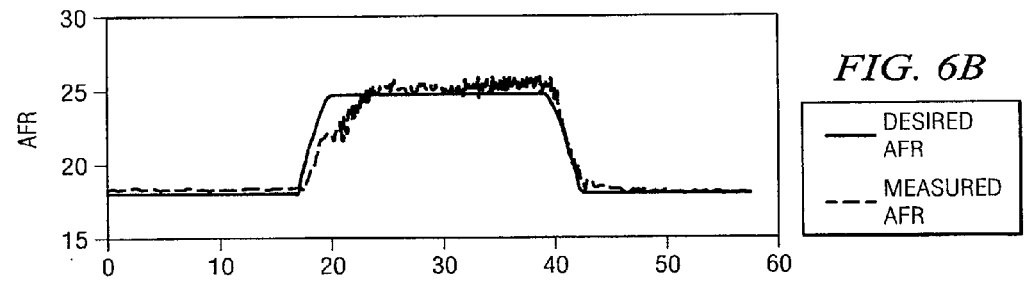

For comparison, FIGS. 6A and 6B illustrate transient engine torque and AFR responses, using the control methods described herein, during light load LTC and conventional diesel combustion mode transitions. Compared with the conventional control approach, obvious improvements are observed. Both torque and AFR have smooth responses even during combustion mode switching. As a result, the engine satisfies both driveability and emissions requirements.

The main reason for this good performance is the closed-loop control on important engine operation variables chosen with respect to different combustion modes. The actuators are automatically manipulated to account for system dynamics. Selected operation variables are tracked close to desired values to ensure good responses for torque and emissions AFR.

The invention claimed is:

1. A control system for achieving desired in-cylinder conditions of a diesel engine, capable of multiple combustion modes, such as conventional diesel combustion and at least one alternate combustion mode, the engine having a turbocharger and an exhaust gas recirculation (EGR) loop, comprising:

a desired torque map for receiving at least an rpm value and for providing a desired torque value based at least in part thereon;

a desired system state map for receiving the desired torque value and for providing a set of desired system state values based at least in part thereon;

a supervisory controller for receiving the rpm value, the desired system state values, and a set of measured or estimated current system state values, and for providing a selected combustion mode based at least in part thereon;

wherein the measured or estimated system state values are at least one or more of the following measured or estimated values: the intake manifold pressure, the pressure between a high pressure throttle between the intake manifold and the compressor of the turbocharger, the exhaust manifold pressure, the compressor power, and a fresh air value; and a first controller for receiving the selected combustion mode and the desired system state values, and for determining a first set of actuator values based at least in part thereon.

2. The system of claim 1, wherein the diesel combustion mode has system state variables of: intake manifold pressure, the fresh air flow rate through the compressor of the turbocharger, and the exhaust manifold pressure; and has actuators of: a high pressure throttle between the compressor and the intake manifold, an EGR throttle, and a variable output turbocharger.

3. The system of claim 2, wherein the fresh air flow rate is based on a MAF sensor that senses fresh air through the compressor of the turbocharger.

4. The system of claim 1, wherein one of the alternate combustion modes is a low temperature combustion mode having system state variables of: intake manifold pressure and the intake manifold fresh air fraction; and having actuators of: a high pressure throttle between the compressor and the intake manifold and an EGR throttle.

5. The system of claim 4, wherein the fresh air fraction is based on measurement of the air-fuel ratio.

6. The system of claim 1, wherein the fresh air value is the fresh air fraction in the intake manifold or the fresh air flow rate through the compressor.

7. The system of claim 1, wherein the actuators are at least one or more of the following actuators: an intake throttle between the intake manifold and the compressor of the turbocharger, an EGR valve, and the turbocharger output.

8. The system of claim 1, wherein the desired torque is further based at least in part on the pedal position value.

9. The system of claim 1, wherein the control system further provides combustion control of the engine, and further comprising a fueling function controller that receives the rpm value, the desired torque value, and the selected combustion mode, and provides fueling actuator values based thereon.

10. A method of selecting a current combustion mode for operating a diesel engine capable of multiple combustion modes, such as a normal diesel combustion mode and at least one alternate combustion mode, the engine having a turbocharger and an exhaust gas recirculation (EGR) loop, comprising:

defining a set of system state variables for each combustion mode;

wherein the system state variables are based on the characteristics of the associated combustion mode;

during operation of the engine, performing the following steps: acquiring a set of measured or estimated current system state values; receiving an rpm value, determining a desired torque value based at least in part on the rpm value; determining a set of desired system state values based on the desired torque value and the rpm value;

selecting a combustion mode, based on the rpm value, the current system state values, and the desired system state values.

11. The method of claim 10, wherein the normal diesel combustion mode has system state variables of: intake manifold pressure, the fresh air flow rate through the compressor of the turbocharger, and exhaust manifold pressure.

12. The method of claim 11, wherein the fresh air flow rate is based on a MAF sensor that senses fresh air through the compressor of the turbocharger.

13. The method of claim 10, wherein one of the alternate combustion modes is a low temperature combustion mode having system state variables of: intake manifold pressure and the intake manifold fresh air fraction.

14. The method of claim 13, wherein the fresh air fraction is based on measurement of the air-fuel ratio.

15. The method of claim 10, wherein the measured or estimated system state values are at least one or more of the following measured or estimated values:

the intake manifold pressure, the pressure between a high pressure throttle between the intake manifold and the compressor of the turbocharger, the exhaust manifold pressure, the compressor power, and a fresh air value.

16. The method of claim 15, wherein the fresh air value is the fresh air fraction in the intake manifold or the fresh air flow rate through the compressor.

17. The method of claim 10, wherein during operation of the engine, the method further comprises measuring a pedal position value, and wherein the desired torque is further based at least in part on the pedal position value.

18. A method of achieving desired in-cylinder conditions of a diesel engine, capable of multiple combustion modes, such as conventional diesel combustion and at least one alternate combustion mode, the engine having a turbocharger and an exhaust gas recirculation (EGR) loop, comprising:

defining a set of system state variables for each combustion mode;

defining a set of actuators for each combustion mode;

wherein the system state variables and actuators are based on the characteristics of the associated combustion mode;

during operation of the engine, performing the following steps: acquiring a set of measured or estimated current system state values; receiving an rpm value, determining a desired torque value based at least in part on the rpm value; determining a set of desired system state values based on the desired torque value and the rpm value;

selecting a combustion mode, based on the rpm value, the current system state values, and the desired system state values;

using a controller to determine actuator values, based on the selected combustion mode and the desired system state values.

19. The method of claim 18, wherein the diesel combustion mode has system state variables of: intake manifold pressure, the fresh air flow rate through the compressor of the turbocharger, and the exhaust manifold pressure; and has actuators of: a high pressure throttle between the compressor and the intake manifold, an EGR throttle, and a variable output turbocharger.

20. The method of claim 19, wherein the fresh air flow rate is based on a MAF sensor that senses fresh air through the compressor of the turbocharger.

21. The method of claim 18, wherein one of the alternate combustion modes is a low temperature combustion mode having system state variables of: intake manifold pressure and the intake manifold fresh air fraction; and having actuators of: a high pressure throttle between the compressor and the intake manifold and an EGR throttle.

22. The method of claim 21, wherein the fresh air fraction is based on measurement of the air-fuel ratio.

23. The method of claim 18, wherein the measured or estimated system state values are at least one or more of the following measured or estimated values:

the intake manifold pressure, the pressure between a high pressure throttle between the intake manifold and the compressor of the turbocharger, the exhaust manifold pressure, the compressor power, and a fresh air value.

24. The method of claim 23, wherein the fresh air value is the fresh air fraction in the intake manifold or the fresh air flow rate through the compressor.

25. The method of claim 18, wherein the actuators are at least one or more of the following actuators: an intake throttle between the intake manifold and the compressor of the turbocharger, an EGR valve, and the turbocharger output.

26. The method of claim 18, wherein during operation of the engine, the method further comprises measuring a pedal position value, and wherein the desired torque is further based at least in part on the pedal position value.

27. The method of claim 18, wherein the method is further used to provide combustion control of the engine, and further providing the step of using a fueling function to receive the rpm value, the desired torque value, and the selected combustion mode and to determine fueling actuator values.

* * * * *